United States Patent

(12) United States Patent
Sakai

(10) Patent No.: US 7,492,425 B2
(45) Date of Patent: Feb. 17, 2009

(54) LIQUID CRYSTAL DEVICE, MANUFACTURING METHOD THEREOF, AND ELECTRONIC APPARATUS

(75) Inventor: Kazuyoshi Sakai, Azumino (JP)

(73) Assignee: Epson Imaging Devices Corporation (JP)

( * ) Notice: Subject to any disclaimer, the term of this patent is extended or adjusted under 35 U.S.C. 154(b) by 294 days.

(21) Appl. No.: 11/493,808

(22) Filed: Jul. 27, 2006

(65) Prior Publication Data

US 2007/0052890 A1 Mar. 8, 2007

(30) Foreign Application Priority Data

Sep. 5, 2005 (JP) ............... 2005-255996

(51) Int. Cl.
*G02F 1/1335* (2006.01)
*G02F 1/13* (2006.01)

(52) U.S. Cl. .............. 349/114; 349/113; 349/139; 349/140; 349/38; 349/187

(58) Field of Classification Search ............. 349/114, 349/139, 140, 141, 187, 138, 113, 56, 38, 349/39
See application file for complete search history.

(56) References Cited

U.S. PATENT DOCUMENTS 6,344,883 B2 * 2/2002 Yamada et al. .............. 349/32
6,731,356 B2 * 5/2004 Yamada et al. .............. 349/84
6,927,817 B2 * 8/2005 Itoh et al. .................... 349/113
2002/0097362 A1 * 7/2002 Yamada et al. .............. 349/130
2007/0052890 A1 * 3/2007 Sakai ......................... 349/114

OTHER PUBLICATIONS

Abstract of JP 2004-085918 Mar. 18, 2004 Seiko Epson Corp.

* cited by examiner

*Primary Examiner*—Brian M Healy
(74) *Attorney, Agent, or Firm*—Lowe Hauptman Ham & Berner, LLP

(57) ABSTRACT

A liquid crystal device includes: a first substrate including a scanning line, a data line, a switching element, a pixel electrode and a storage capacitor associated with an intersection of the scanning line and the data line; a second substrate; and liquid crystal interposed between the substrates. A region where the pixel electrode is provided includes a reflective region and a transmissive region. An insulation layer is provided in the reflective region and the transmissive region to cover the switching element. A liquid crystal thickness adjustment layer is provided on the insulation layer in the reflective region. The pixel electrode is provided on the insulation layer in the transmissive region and on the liquid crystal thickness adjustment layer in the reflective region. Further, the storage capacitor includes an electrode disposed on the insulation layer in the reflective region and electrically connected to the pixel electrode.

11 Claims, 10 Drawing Sheets

III—III CROSS-SECTIONAL VIEW

LIQUID CRYSTAL DEVICE, MANUFACTURING METHOD THEREOF, AND ELECTRONIC APPARATUS

BACKGROUND

1. Technical Field

The present invention relates to a liquid crystal device, a manufacturing method of the liquid crystal device, and an electronic apparatus equipped with the liquid crystal device.

2. Related Art

There has been known a liquid crystal device that displays an image with the use of liquid crystal. Such a liquid crystal device may be a transflective liquid crystal device which has both functions of transmissive display utilizing illumination light by an illumination unit like a backlight and of reflective display utilizing reflection light of ambient light like natural light or room light.

Such a liquid crystal device includes a liquid crystal panel and the backlight as the illumination unit. The liquid crystal panel has a display region provided with a plurality of pixels, and a scanning line drive circuit and a data line drive circuit which are provided in the periphery of the display region for driving the pixels.

The liquid crystal panel includes an element substrate on which thin film transistors (hereinafter, referred to as TFTs) as switching elements are arranged corresponding to the pixels, a counter substrate opposing the element substrate, and liquid crystal as electro-optic material interposed between the element substrate and the counter substrate.

The element substrate includes a plurality of scanning lines provided at predetermined intervals; a plurality of data lines substantially perpendicular to the scanning lines, the data lines provided at predetermined intervals; a plurality of common lines substantially parallel to the scanning lines, the common lines and the scanning lines alternatively arranged; and the TFTs and pixel electrodes provided corresponding to the intersections of the scanning lines and the data lines, respectively.

The counter substrate includes common electrodes opposing the pixel electrodes, and a plurality of color filters for multiple colors provided corresponding to the pixels. The common electrodes provided on the counter substrate are electrically connected to the common lines provided on the element substrate through a conductive portion arranged between the element substrate and the counter substrate.

Each pixel includes a storage capacitor with an end thereof electrically connected to the pixel electrode, in addition to the TFT, the pixel electrode, and the common electrode.

A gate of the TFT is connected to the scanning line, a source of the TFT is connected to the data line, and a drain of the TFT is connected to the pixel electrode and to the storage capacitor.

In addition, the pixel includes a region for the transmissive display (hereinafter, referred to as a transmissive region), and a region for the reflective display (hereinafter, referred to as a reflective region). The above-described TFT and storage capacitor have light-shielding properties and are provided in the reflective region, while the pixel electrode and the common electrode are transparent and are provided over the transmissive region and the reflective region.

A liquid crystal thickness adjustment layer for adjusting the thickness of a liquid crystal layer, and a reflection film for reflecting incident light are formed in the reflective region.

The above-described liquid crystal device operates as follows. Application of a selected voltage from the scanning line drive circuit to the scanning lines in a line-sequential manner selects all pixels associated with a certain scanning line. Then, image signals are supplied to the data lines from the data line drive circuit simultaneously with the selection of the pixels. Owing to this, the image signals are supplied from the data lines through the TFTs to the pixels selected by the scanning line drive circuit and the data line drive circuit, whereby image data is written in the pixel electrodes.

Upon writing the image data in the pixel electrodes, a driving voltage is applied to the liquid crystal due to the potential difference between the voltage applied to the pixel electrodes and that applied to the common electrodes. That is, the voltage levels of the image signals are varied to vary the orientation and the order of the liquid crystal, so as to provide a display with gray scales according to optical modulation of the pixels.

Here, in an environment with insufficient ambient light, the transmissive display is performed with the use of the light from the backlight. That is, the light emitted from the backlight passes through the element substrate, the liquid crystal layer and the counter substrate, and then is emitted from the liquid crystal panel.

On the other hand, in an environment with sufficient ambient light, the reflective display is performed. That is, the ambient light incident from the outside passes through the counter substrate and the liquid crystal layer, is reflected by the reflection film, passes through the liquid crystal layer and the counter substrate again, and then is emitted from the liquid crystal panel.

Incidentally, according to the above-described liquid crystal device, the driving voltage which is applied to the liquid crystal is held by a storage capacitor, which is for instance configured as follows (refer to JP-A-2004-85918).

To be more specific, the scanning line and a pixel-potential-side capacitance electrode of the storage capacitor are formed on the element substrate. An insulation layer is formed on the scanning line and the pixel-potential-side capacitance electrode of the storage capacitor. The data line and a common-potential-side capacitance electrode of the storage capacitor are formed on the insulation layer.

The above-described storage capacitor includes the two oppositely arranged capacitance electrodes of the common-potential-side capacitance electrode of the storage capacitor and the pixel-potential-side capacitance electrode of the storage capacitor. These two electrodes are made of light-shielding materials. Due to this, the storage capacitor is disposed in the reflective region for ensuring aperture ratio.

The storage capacitor needs to ensure a sufficient capacity such that the driving voltage which is applied to the liquid crystal can be held. The capacity of the storage capacitor is in proportion to the areas of the two capacitance electrodes, while being in inverse proportion to the gap therebetween. Accordingly, as a method for increasing the capacity of the storage capacitor, the areas of the two capacitance electrodes may be increased, or the gap between the two capacitance electrodes may be decreased.

However, the increase in the areas of the two capacitance electrodes may cause the capacitance electrodes to extend beyond the reflective region and thus be exposed to the transmissive region, thereby degrading the aperture ratio.

Also, the decrease in the gap between the two capacitance electrodes, i.e., decreasing the thickness of the insulation layer provided between the two capacitance electrodes, results in that the scanning line is arranged close to the data line, thereby increasing the influence of cross talk on the intersection of the scanning line and the data line.

SUMMARY

An advantage of some aspects of the invention is that it provides a liquid crystal device, a manufacturing method of the liquid crystal device, and an electronic apparatus, each of which can prevent cross talk of a scanning line and a data line, while ensuring a sufficient capacity for a storage capacitor.

A liquid crystal device according to an aspect of the invention includes: a first substrate including a scanning line, a data line intersecting with the scanning line, a switching element, a pixel electrode and a storage capacitor which are provided in association with an intersection of the scanning line and the data line; a second substrate opposing the first substrate; and liquid crystal interposed between the first substrate and the second substrate. A region where the pixel electrode is provided includes a reflective region and a transmissive region. An insulation layer is provided in the reflective region and the transmissive region to cover the switching element. A liquid crystal thickness adjustment layer is provided on the insulation layer in the reflective region. The pixel electrode is provided on the insulation layer in the transmissive region and on the liquid crystal thickness adjustment layer in the reflective region. The storage capacitor includes a first capacitance electrode which is disposed on the insulation layer in the reflective region and is electrically connected to the pixel electrode, and a second capacitance electrode opposing the first capacitance electrode with the insulation layer disposed therebetween.

With this configuration, the insulation layer is provided on the switching element, and the first capacitance electrode and the second capacitance electrode are oppositely arranged with the insulation layer interposed.

That is, since the switching element is provided below the insulation layer, for instance, when the scanning line and the data line connected to the switching element, and the second insulation layer between the scanning line and the data line are provided below the insulation layer, increase in thickness of the second insulation layer can ensure the interval between the scanning line and the data line, thereby preventing the cross talk from occurring. In addition, decrease in thickness of the insulation layer can ensure a sufficient capacity for the storage capacitor.

In the liquid crystal device according to the aspect of the invention, the first capacitance electrode may be preferably provided by extending the pixel electrode in the transmissive region to a space between the insulation layer and the liquid crystal thickness adjustment layer. In addition, the pixel electrode in the transmissive region may be preferably electrically connected to the pixel electrode in the reflective region.

With this configuration, since the pixel electrode in the transmissive region extends to the space between the insulation layer and the liquid crystal thickness adjustment layer to provide the first capacitance electrode, for instance, provision of only a transparent conductive film on the insulation layer can easily provide the pixel electrode in the transmissive region and the first capacitance electrode.

In addition, the pixel electrode in the transmissive region is electrically connected to the pixel electrode in the reflective region. Accordingly, even though the transparent conductive film extends in the reflective region to serve as the first capacitance electrode, the driving voltage can be applied to the liquid crystal in the reflective region.

In the liquid crystal device according to the aspect of the invention, the pixel electrode provided in the reflective region may be preferably a reflection film.

With this configuration, since the pixel electrode in the reflective region serves as the reflection film, the reflection film reflects the incident light to perform the reflective display.

In addition, since the pixel electrode in the reflective region is provided by forming the reflection film on the liquid crystal thickness adjustment layer, for instance, even though the transparent conductive film extends in the reflective region to serve as the first capacitance electrode, the pixel electrode can be provided in the reflective region.

In the liquid crystal device according to the aspect of the invention, the second capacitance electrode may be preferably an island-like electrode and electrically connected to a common line which is provided in a lower layer than the second capacitance electrode.

With this configuration, the second capacitance electrode is formed in the island-like shape, and is electrically connected to the common line in the lower layer. Accordingly, by providing the common electrode which opposes the pixel electrode, and electrically connecting the common electrode to the common line, the driving voltage of the liquid crystal due to the potential difference between the pixel electrode and the common electrode can be held by the first capacitance electrode, which has the same potential as that of the pixel electrode, and by the second capacitance electrode, which has the same potential as that of the common line.

An electronic apparatus according to another aspect of the invention includes the above-described liquid crystal device.

With this configuration, the same advantages as described above can be attained.

A manufacturing method of liquid crystal device according to still another aspect of the invention is provided. The liquid crystal device includes a first substrate including a scanning line, a data line intersecting with the scanning line, a switching element, a pixel electrode and a storage capacitor which are provided in association with an intersection of the scanning line and the data line; a second substrate opposing the first substrate; and liquid crystal interposed between the first substrate and the second substrate. The manufacturing method includes: providing a reflective region and a transmissive region in a region where the pixel electrode is formed; forming the capacitor electrode of the storage capacitor in the reflective region; forming an insulation layer in the reflective region and the transmissive region to cover the switching element and a first capacitance electrode of the storage capacitor; forming a part of the pixel electrode on the insulation layer in the transmissive region, while forming a second capacitance electrode on the insulation layer in the reflective region, the second capacitance electrode being electrically connected to the pixel electrode and opposing the first capacitance electrode; forming a liquid crystal thickness adjustment layer on the second capacitance electrode in the reflective region; and forming a residual part of the pixel electrode on the liquid crystal thickness adjustment layer.

With this method, the same advantages as described above can be attained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an exemplary embodiment of the invention will be described below with reference to accompanying drawings. Note that like numbers reference like elements and like descriptions will be omitted or simplified in the following exemplary embodiment and modifications.

Exemplary Embodiment

Figure 1:
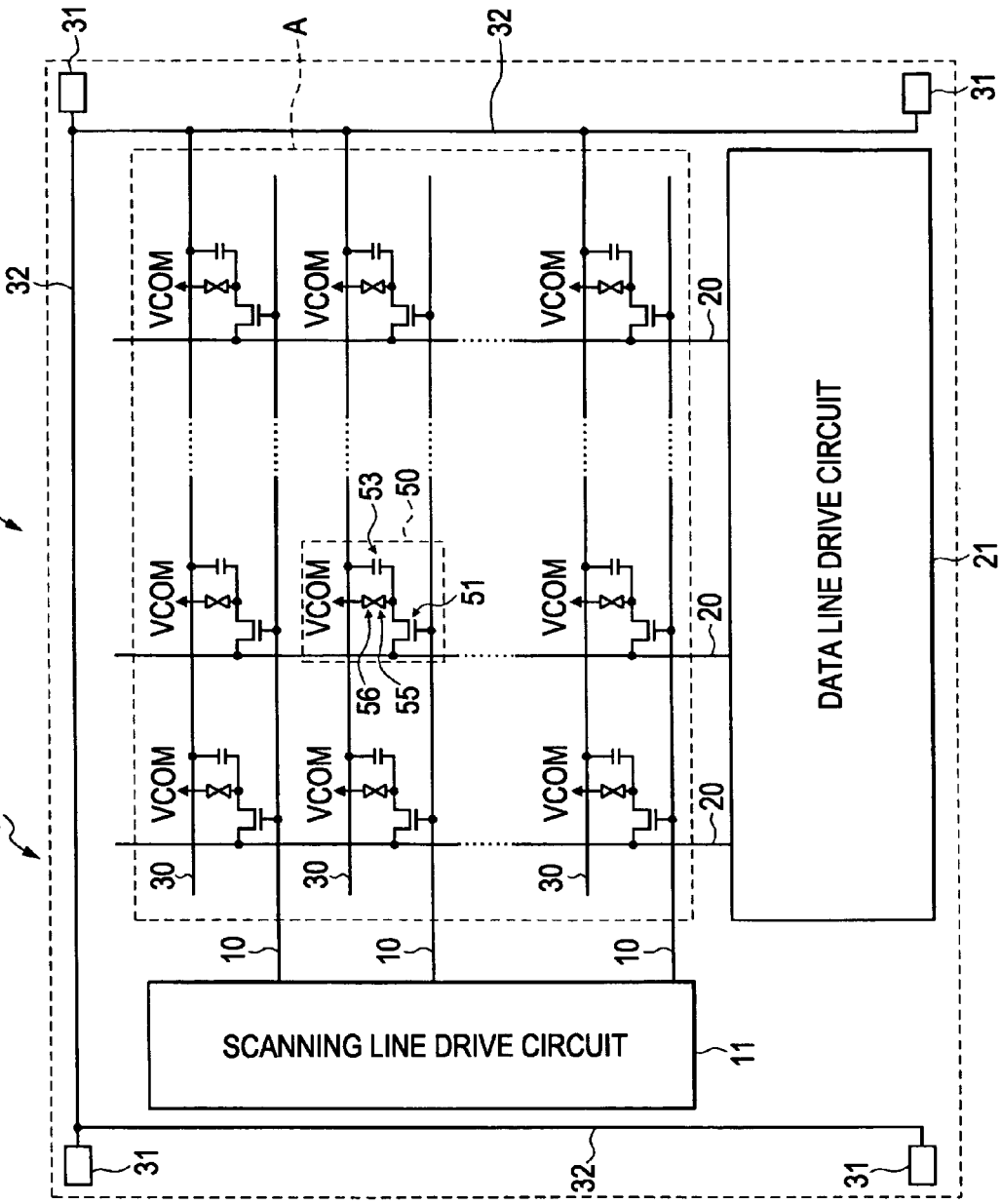
FIG. 1 is a block diagram showing the configuration of a liquid crystal device according to an exemplary embodiment of the invention.

FIG. 1 is a block diagram of a liquid crystal device 1 according to an exemplary embodiment of the invention.

Figure 4:
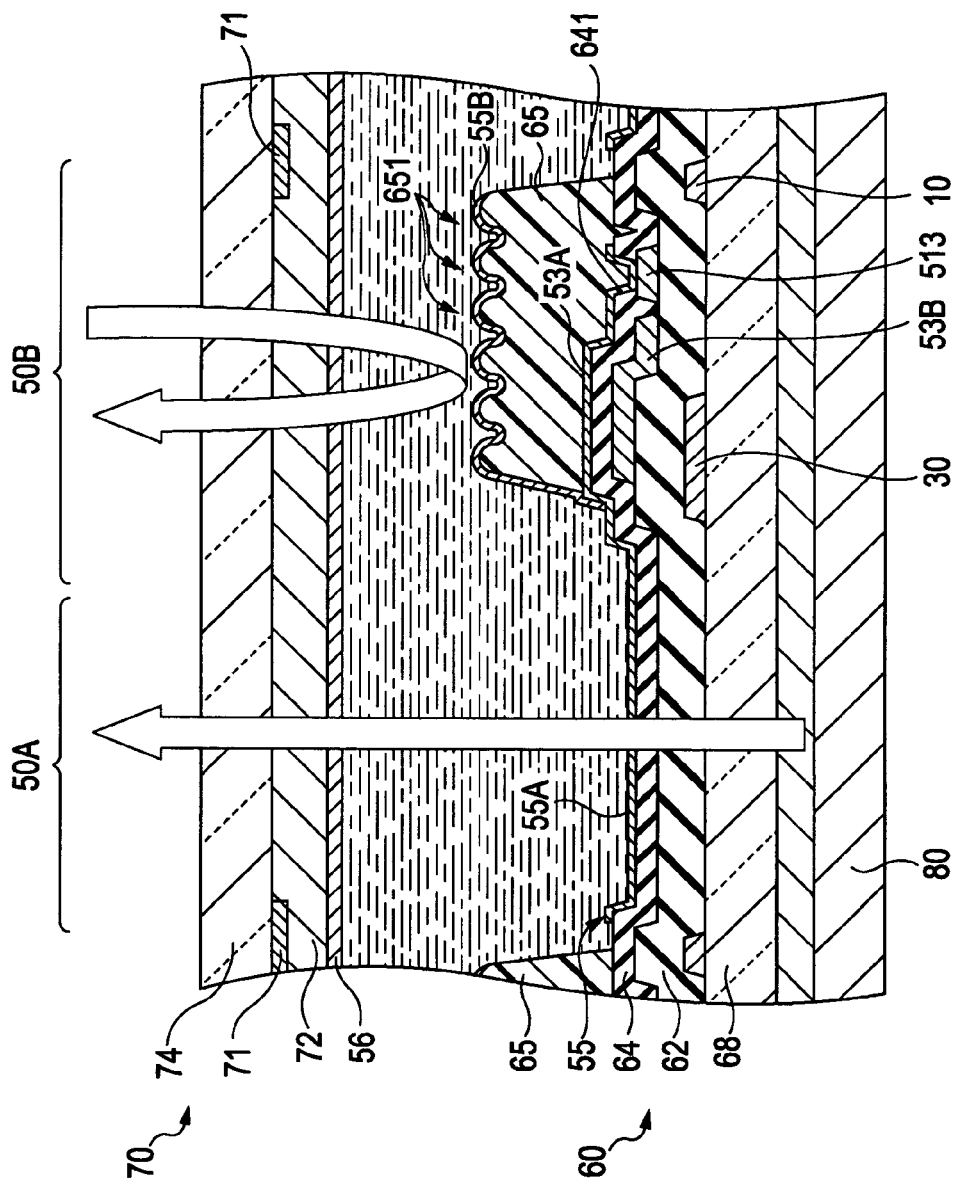
FIG. 4 is a cross-sectional view taken along line IV-IV of the liquid crystal device.
Figure 5:
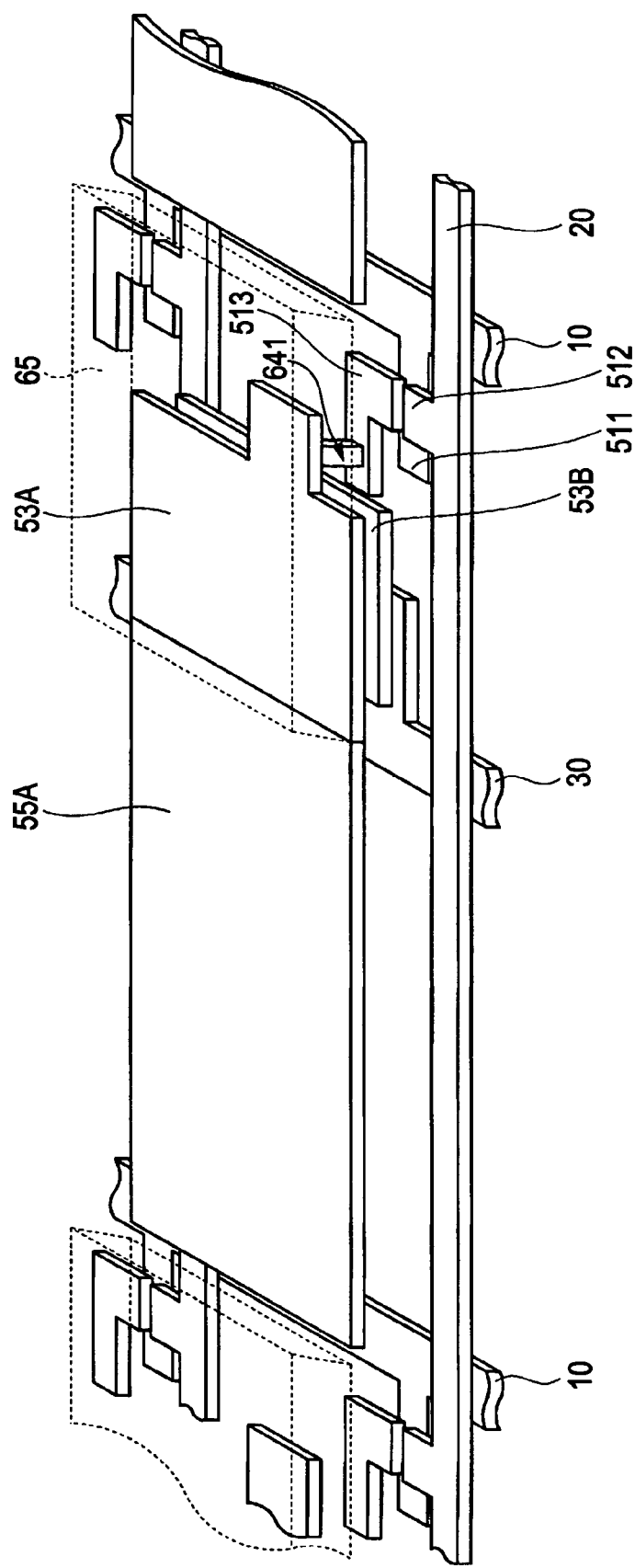
FIG. 5 is an enlarged perspective view partially showing the schematic configuration of the liquid crystal device.

The liquid crystal device 1 includes a liquid crystal panel AA and a backlight unit as an illumination unit (see FIGS. 4 and 5). The liquid crystal panel AA includes a display region A which is provided with a plurality of pixels 50, and a scanning line drive circuit 11 and a data line drive circuit 21 which are provided in the periphery of the display region A for driving the pixels 50.

The liquid crystal panel AA includes a plurality of scanning lines 10 and a plurality of common lines (capacitance lines) 30, the scanning lines 10 and the common lines 30 being alternatively arranged at predetermined intervals, and a plurality of data lines 20, the data lines 20 intersecting with the scanning lines 10 and being arranged at predetermined intervals. Each pixel 50 is disposed at the intersection of the scanning line 10 and the data line 20.

The pixel 50 includes a pixel transistor 51, a pixel electrode 55, a common electrode 56 which opposes the pixel electrode 55, and a storage capacitor 53 with an end thereof electrically connected to the pixel electrode 55 and another end thereof electrically connected to the common line 30.

A gate electrode of the pixel transistor 51 is connected to the scanning line 10, a source electrode of the pixel transistor 51 is connected to the data line 20, and a drain electrode of the pixel transistor 51 is connected to the pixel electrode 55 and to the storage capacitor 53. Liquid crystal is interposed between the pixel electrode 55 and the common electrode 56. Accordingly, when a selected voltage is applied to the pixel transistor 51 from the scanning line 10, the pixel transistor 51 allows the data line 20, the pixel electrode 55 and the storage capacitor 53 to be in a conductive state.

The common electrode 56 is connected to the common line 30 through conductive portions 31, which are provided on the four corners of the liquid crystal panel AA, and through common wiring 32, which connects the conductive portions 31 to each other.

The scanning line drive circuit 11 applies a selected voltage that allows the pixel transistor 51 to be in the On-state to the scanning lines 10 in a line-sequential manner. For example, when the selected voltage is applied to a certain scanning line 10, all pixel transistors 51 connected to that scanning line 10 become the conductive state, so that all pixels 50 associated with that scanning line 10 are selected.

The data line drive circuit 21 supplies image signals to the data lines 20, whereby image data is sequentially written in the pixel electrodes 55 of the pixels 50 through the On-state pixel transistors 51. Herein, the data line drive circuit 21 alternatively performs positive polarity writing, which supplies the image signals to the data lines 20 with a voltage higher than that of the common electrodes 56, and negative polarity writing, which supplies the image signals to the data lines 20 with a voltage lower than that of the common electrodes 56.

The liquid crystal device 1 operates as follows.

Application of the selected voltage from the scanning line drive circuit 11 in a line-sequential manner selects all pixels 50 associated with the certain scanning line 10. Then, the image signals are supplied to the data lines 20 from the data line drive circuit 21 simultaneously with the selection of the pixels 50. Owing to this, the image signals are supplied to all pixels 50 that are selected by the scanning line drive circuit 11 and the data line drive circuit 21, from the data lines 20 through the pixel transistors 51, whereby the image data is written in the pixel electrodes 55.

At this time, the above-described positive polarity writing and negative polarity writing are alternatively performed in the liquid crystal device 1 by the data line drive circuit 21.

Upon writing the image data in the pixel electrodes 55 of the pixels 50, the potential difference between the voltage applied to the pixel electrodes 55 and that applied to the common electrodes 56 causes a driving voltage to be applied to the liquid crystal. That is, the voltage levels of the image signals are varied to vary the orientation and the order of the liquid crystal, so as to provide a display with gray scales according to optical modulation of the pixels 50.

Note that the driving voltage applied to the liquid crystal can be held for a period of time which is three orders of magnitude longer than that for writing the image data, because of the storage capacitor 53.

Figure 2:
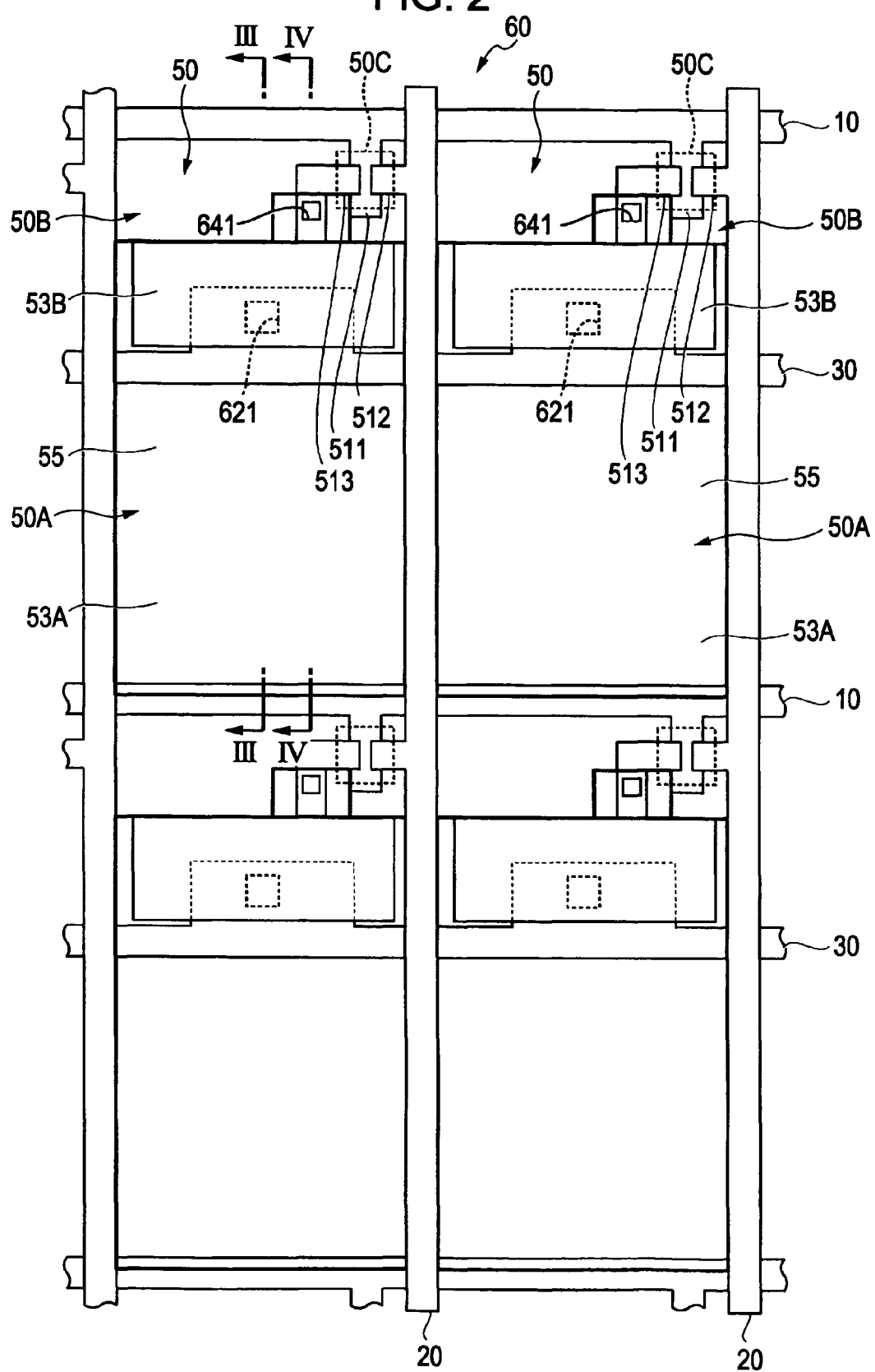
FIG. 2 is an enlarged plan view of the liquid crystal device.
Figure 3:
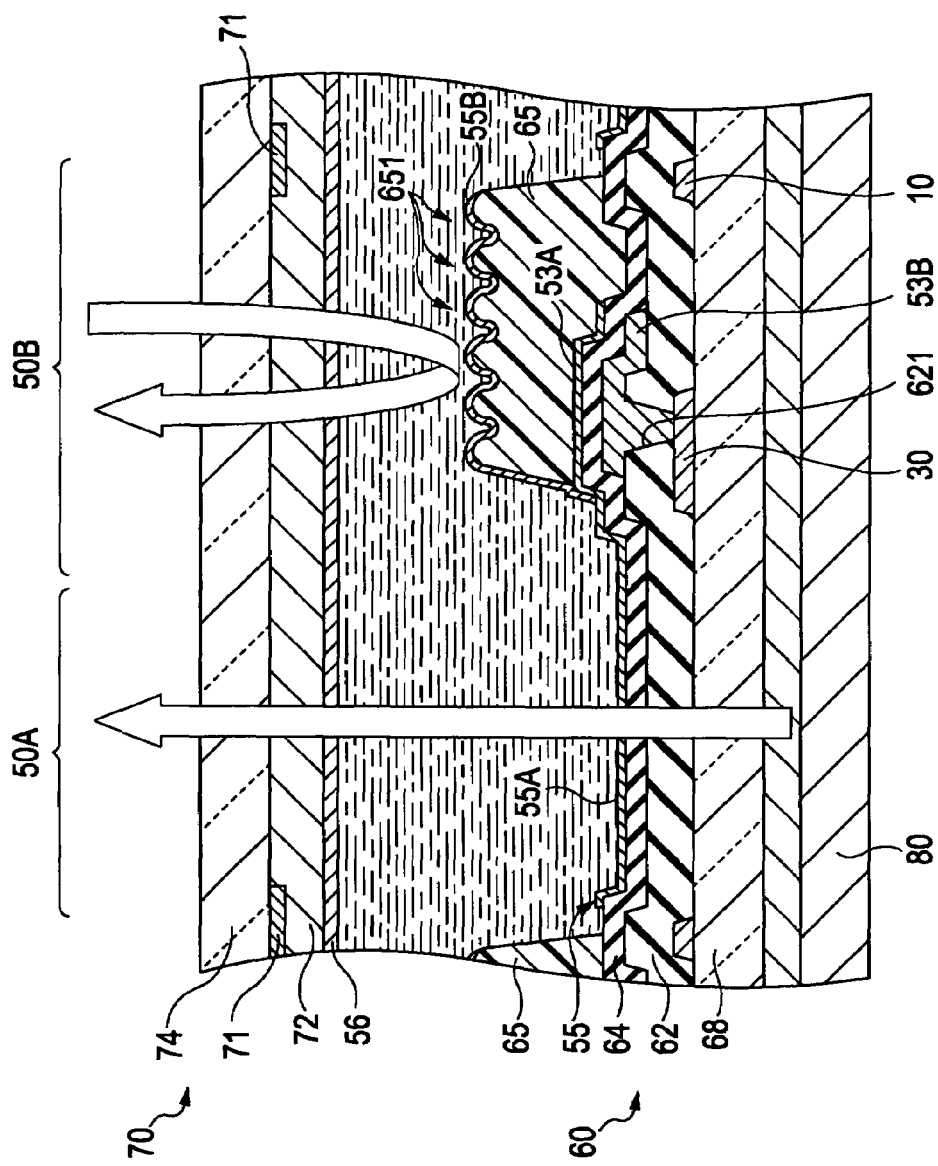
FIG. 3 is a cross-sectional view taken along line III-III of the liquid crystal device.

FIG. 2 is an enlarged plan view of the pixels 50 of the liquid crystal device 1. FIG. 3 is a cross-sectional view taken along line III-III of the liquid crystal device 1. FIG. 4 is a cross-sectional view taken along line IV-IV of the liquid crystal device 1. FIG. 5 is an enlarged perspective view partially showing the schematic configuration of the liquid crystal device 1.

As shown in FIGS. 3 and 4, the above-described liquid crystal panel AA includes an element substrate 60 as a first substrate, on which the pixel transistors 51 as switching elements are arranged corresponding to the pixels 50; a counter substrate 70 as a second substrate opposing the element substrate 60; and liquid crystal interposed between the element substrate 60 and the counter substrate 70.

As shown in FIG. 2, each pixel 50 is disposed in a region surrounded by the two adjacent scanning lines 10 made of light-shielding conductive material and the two adjacent data lines 20 made of light-shielding conductive material. That is, the pixels 50 are parted by the scanning lines 10 and by the data lines 20.

Each pixel 50 includes a transmissive region 50A for providing the transmissive display and a reflective region 50B for providing the reflective display. Accordingly, a region where the pixel electrode is formed has the reflective region 50B and the transmissive region 50A. In addition, the pixel electrode 55 includes a transmissive-region-side pixel electrode 55A arranged in the transmissive region 50A and a reflective-region-side pixel electrode 55B arranged in the reflective region 50B. The common line 30 is made of light-shielding conductive material, and provided along the border of the transmissive region 50A and the reflective region 50B.

In the exemplary embodiment, the pixel transistor 51 is an inversed-staggered amorphous silicon TFT. The reflective region 50B is provided with a region 50C (an area surrounded by a dashed-line in FIG. 2), in which the TFT 51 is formed.

The element substrate 60 will be described below.

The element substrate 60 has a glass substrate 68. An underlying insulation layer (not shown) is formed over the glass substrate 68 to prevent the glass substrate 68 from being damaged at the surface thereof or from being deteriorated in the characteristics of the TFT 51 due to dirt.

On the underlying insulation film, the above-described scanning lines 10 and common lines 30 made of the light-shielding conductive material are formed.

The scanning line 10 is disposed along the border of the adjacent pixel 50. A part of the scanning line 10 in the vicinity of the intersection with the data line 20 protrudes toward the reflective region 50B to form a gate electrode 511 of the TFT 51.

A gate insulation film 62 is formed on the gate electrode 511, the scanning line 10 and the common line 30, i.e., over the pixel 50 including the reflective region 50B and the transmissive region 50A.

A contact hole 621 is formed in the gate insulation film 62 substantially at the center of each pixel 50. The contact hole 621 allows a common-potential-side capacitance electrode 53B (described later) as a second capacitance electrode of the storage capacitor 53 to be connected to the common line 30.

The common-potential-side capacitance electrode 53B, which is configured to be an island-like shape, of the storage capacitor 53 is formed in the reflective region 50B on the gate insulation film 62 at an area not occupied by the TFT 51. The common-potential-side capacitance electrode 53B is electrically connected to the common line 30 formed below the gate insulation film 62, through the above-mentioned contact hole 621.

Laminated on the gate insulation film 62 in the region 50C with the TFT 51 formed are a semiconductor layer (not shown) made of amorphous silicon, and then an ohmic contact layer (not shown) made of n+ amorphous silicon, oppositely to the gate electrode 511. Laminated on the ohmic contact layer are the source electrode 512 and the drain electrode 513 to form the amorphous silicon TFT.

The drain electrode 513 is electrically connected to a pixel-potential-side capacitance electrode 53A as a first capacitance electrode of the storage capacitor 53, through a contact hole 641 (described later).

The source electrode 512 is made of the same conductive material (the same layer) as that of the data line 20. That is, the source electrode 512 extends from the data line 20. The data line 20 intersects with the scanning line 10 and the common line 30.

The provision of the gate insulation film 62 between the data line 20; and the scanning line 10 and the common line 30 insulates the data line 20 from the scanning line 10 and the common line 30.

The common-potential-side capacitance electrode 53B, the source electrode 512, the drain electrode 513 and the data line 20 are covered with a passivation film 64 as an insulation layer, over the pixel 50 including the reflective region 50B and the transmissive region 50A.

In the passivation film 64, the contact hole 641 is formed for connecting the pixel-potential-side capacitance electrode 53A to the drain electrode 513.

The above-described transmissive-region-side pixel electrode 55A formed of a transparent conductive film such as ITO (Indium Tin Oxide) or IZO (Indium Zinc Oxide) is formed in the transmissive region 50A on the passivation film 64.

The transmissive-region-side pixel electrode 55A extends to an area opposing the reflective-region-side pixel electrode 55B in the reflective region 50B on the passivation film 64, to serve as the pixel-potential-side capacitance electrode 53A of the storage capacitor 53, and is electrically connected to the drain electrode 513 through the above-described contact hole 641. In other words, the pixel-potential-side capacitance electrode 53A is arranged on the passivation film 64 in the reflective region 50B, and is electrically connected to the transmissive-region-side pixel electrode 55A. The above-described common-potential-side capacitance electrode 53B opposes the pixel-potential-side capacitance electrode 53A with the passivation film 64 interposed.

A liquid crystal thickness adjustment layer 65 made of acrylic resin for adjusting the thickness of the liquid crystal layer is formed on the pixel-potential-side capacitance electrode 53A and on the passivation film 64 in the reflective region 50B at an area not occupied by the pixel-potential-side capacitance electrode 53A. In other words, the pixel-potential-side capacitance electrode 53A is formed by extending the transmissive-region-side pixel electrode 55A in the transmissive region 50A to a space between the passivation film 64 and the liquid crystal thickness adjustment layer 65.

A plurality of recessed portions 651 for diffusing the reflected light are irregularly formed on the surface of the liquid crystal thickness adjustment layer 65 toward the liquid crystal layer.

The reflective-region-side pixel electrode 55B is formed on the liquid crystal thickness adjustment layer 65. The reflective-region-side pixel electrode 55B is electrically connected to the transmissive-region-side pixel electrode 55A in the vicinity of the border between the transmissive region 50A and the reflective region 50B. In addition, the reflective-region-side pixel electrode 55B has projections and recesses corresponding to the recessed portions 651 of the liquid crystal thickness adjustment layer 65, for light diffusing purposes. An area of the reflective-region-side pixel electrode 55B not occupied by the recessed portions 651 serves as a reflection film for reflecting the incident light.

An alignment film (not shown) formed of an organic film like a polyimide film is formed on the transmissive-region-side pixel electrode 55A and the reflective-region-side pixel electrode 55B.

Next, the counter substrate 70 will be described below.

The counter substrate 70 has a grass substrate 74, and a light-shielding film 71 which serves as a black matrix is formed on the glass substrate 74 at a position opposing the scanning line 10 and the data line 20.

A color filter 72 is formed on the glass substrate 74 and the light-shielding film 71. In the exemplary embodiment, the pixels 50 adjacent in a direction, along which the transmissive region 50A and the reflective region 50B are connected, have color layers with the same color. The common electrode 56 formed of a transparent conducting film like ITO (Indium Tin Oxide) or IZO (Indium Zinc Oxide) is formed on the color filter 72, the common electrode 56 opposing the pixel electrode 55 including the transmissive-region-side pixel electrode 55A and the reflective-region-side pixel electrode 55B. An alignment film (not shown) is formed on the common electrode 56.

The liquid crystal layer is formed between the element substrate 60 and the counter substrate 70, the liquid crystal layer being sealed with a seal (see FIG. 7) formed at the periphery of the element substrate 60 and on that of the counter substrate 70. The liquid crystal layer is thin in the reflective region 50B where the liquid crystal thickness adjustment layer 65 is provided, and is thick in the transmissive region 50A, so that the optical path (length) for the light passing through the liquid crystal layer is adjusted to be uniform either in the reflective display and in the transmissive display.

Though not shown, retardation films and polarizer films are provided on the surfaces of the element substrate 60 and counter substrate 70.

A backlight unit 80 as a light source is provided at a position opposing the element substrate 60.

Next, the transmissive display and the reflective display with the liquid crystal device 1 will be described below.

In an environment with insufficient ambient light, the liquid crystal device 1 performs the transmissive display with the use of the light from the backlight unit 80. Specifically, as shown by arrows in FIGS. 3 and 4, the light emitted from the backlight unit 80 is polarized by the polarizer film (not shown) provided on the element substrate 60 to be linearly polarized light, passes through the glass substrate 68, the gate insulation film 62, the passivation film 64 and the transmissive-region-side pixel electrode 55A, and then is incident on the liquid crystal layer.

The polarization direction of the light incident on the liquid crystal layer is then turned by the liquid crystal in accordance with the applied voltage due to the potential difference between the transmissive-region-side pixel electrode 55A in the transmissive region 50A and the common electrode 56. Then the light passes through the common electrode 56, the color filter 72 and the glass substrate 74, and then reaches the polarizer film (not shown) of the counter substrate 70. The light reached to the polarizer film passes through the polarizer film in accordance with the turning degree of the light in the polarization direction due to the liquid crystal.

On the other hand, in an environment with sufficient ambient light, the reflective display is performed. Specifically, as shown by arrows in FIGS. 3 and 4, the ambient light incident from the outside is polarized by the polarizer film (not shown) of the counter substrate 70 to be the linearly polarized light, passes through the glass substrate 74, the color filter 72 and the common electrode 56, and is incident on the liquid crystal layer. The light incident on the liquid crystal layer is reflected by the reflective-region-side pixel electrode 55B, and passes through the liquid crystal layer again. While passing through the liquid crystal layer, the polarization direction of the light is turned by the liquid crystal in accordance with the applied voltage due to the potential difference between the reflective-region-side pixel electrode 55B in the reflective region 50B and the common electrode 56. The light passed through the liquid crystal layer passes the common electrode 56, the color filter 72 and the glass substrate 74 again, and reaches the polarizer film of the counter substrate 70. The light reached to the polarizer film passes through the polarizer film in accordance with the turning degree of the light in the polarization direction due to the liquid crystal.

Figure 6:
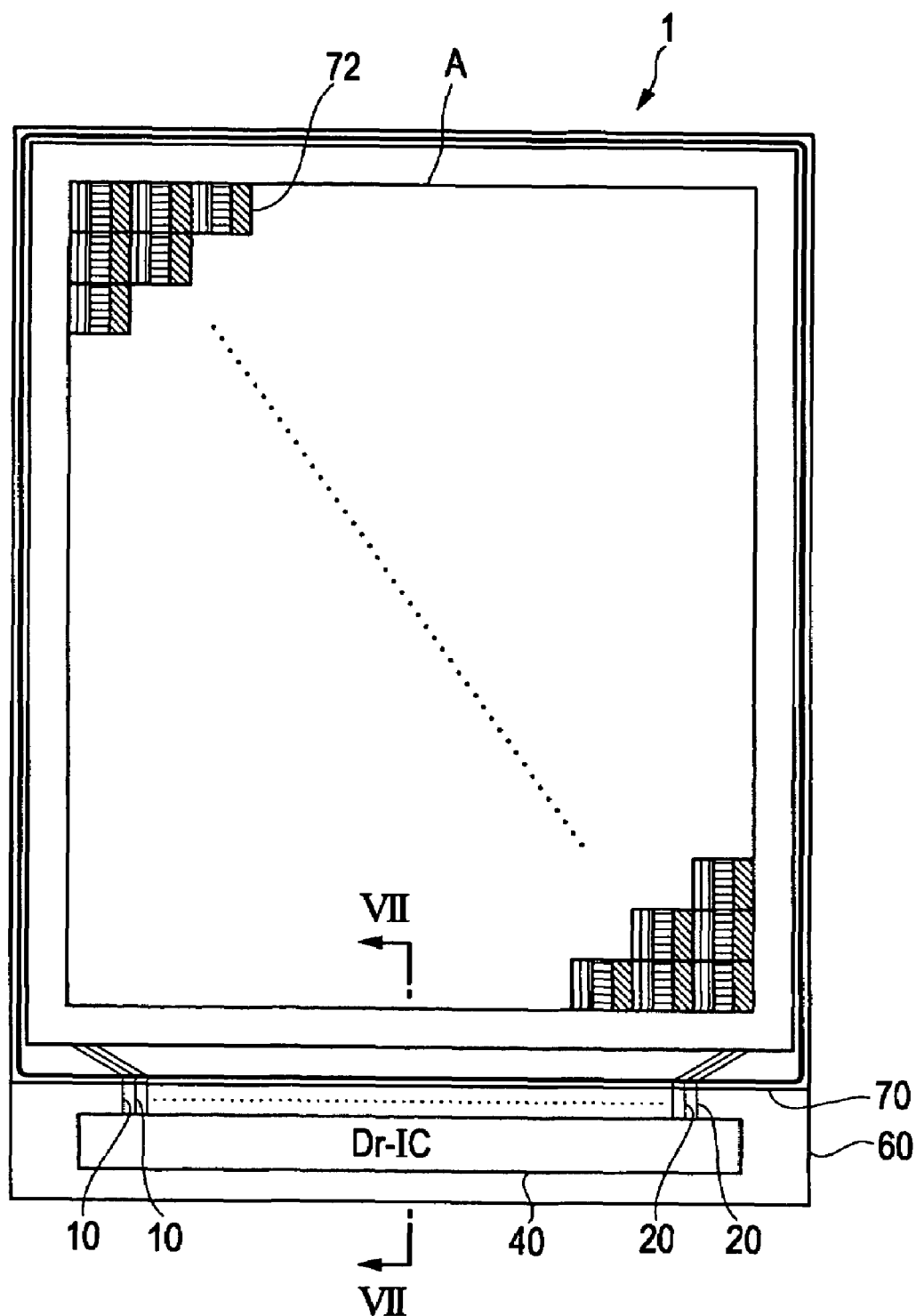
FIG. 6 is a plan view of the liquid crystal device.

FIG. 6 is a plan view of the liquid crystal device 1.

A driver IC 40, which is formed by electronic components including the scanning line drive circuit 11 and the data line drive circuit 21, is formed on the element substrate 60 of the liquid crystal device 1, at the periphery of the display region A. The above-described scanning line 10 and data line 20 are electrically connected to the driver IC 40.

Figure 7:
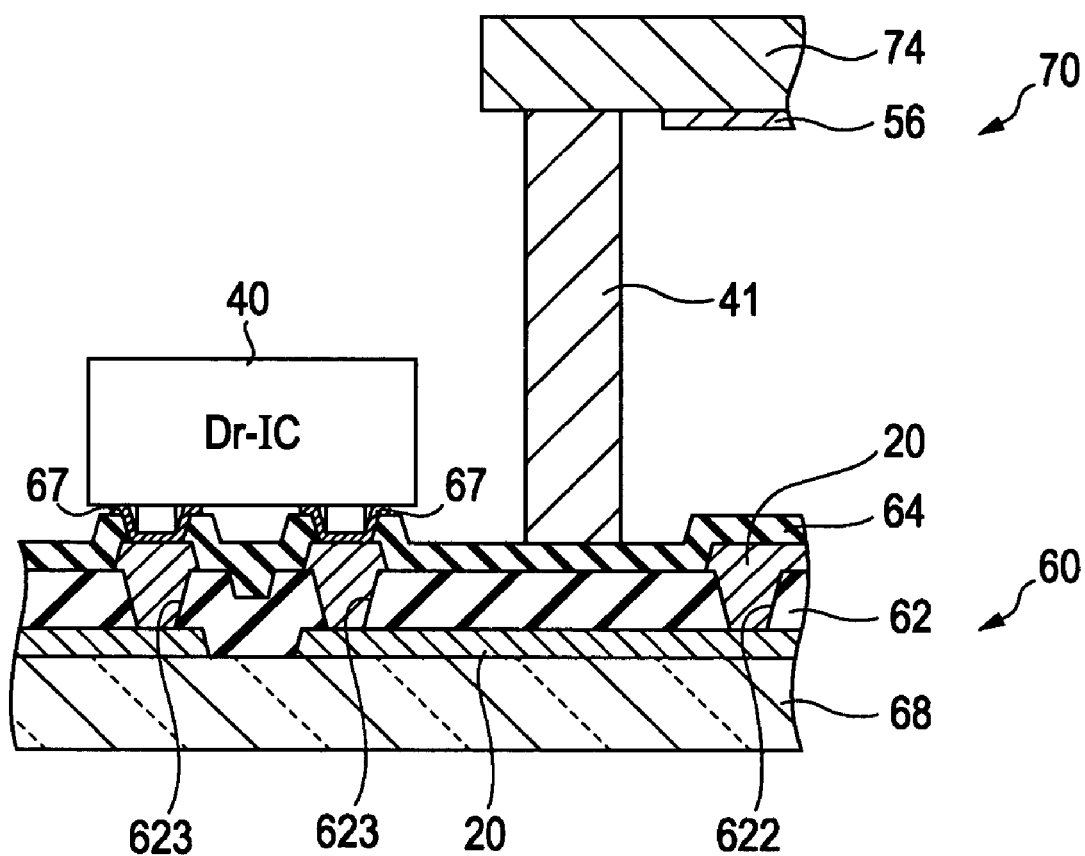
FIG. 7 is a cross-sectional view taken along line VII-VII of the liquid crystal device.

FIG. 7 is a cross-sectional view taken along line VII-VII of the liquid crystal device 1.

A seal 41 for sealing the liquid crystal layer is provide on the periphery of the element substrate 60 and on that of the counter substrate 70.

The above-described underlying insulation film (not shown) is formed on the glass substrate 68 in a peripheral edge portion of the element substrate 60, and then the scanning line 10 and the data line 20 are formed on the underlying insulation film. In addition, the gate insulation film 62 is formed on the scanning line 10 and the data line 20, and then the passivation film 64 is formed on the gate insulation film 62.

A contact hole 622 is formed in the gate insulation film 62 at a position toward the display region A relative to the seal 41, so that the data line 20 extending from the vicinity of the pixel 50 is connected to the data line 20 formed on the underlying insulation film, through the contact hole 622.

In addition, a contact hole 623 is formed in the gate insulation film 62 and in the passivation film 64 on the outside of the display region A, so that the scanning line 10 and data line 20, which are formed on the underlying insulation film, are connected to the driver IC 40 through the contact hole 623.

A conductive electrode 67 formed of a transparent conductive film is provided at the surface of the contact hole 623.

As described above, since the data line 20 is formed at the same level as the scanning line 10 in the peripheral edge portion of the element substrate 60 with the seal 41 provided, the two insulation layers of the gate insulation film 62 and the passivation film 64 are interposed between the driver IC 40 formed in the peripheral edge portion of the element substrate 60; and the data line 20 and the scanning line 10. Accordingly, the influence of the cross talk on the driver IC 40 caused by the data line 20 and the scanning line 10 can be further decreased.

Next, manufacturing procedures of the element substrate 60 of the liquid crystal device 1 will be described below with reference to FIGS. 8A through 8E and FIGS. 9A through 9E.

Note that FIGS. 8A through 8E illustrate the manufacturing procedures of the display region A of the element substrate 60, corresponding to a cross section of the liquid crystal device 1 in FIG. 3 taken along line III-III, while FIGS. 9A through 9E illustrate the manufacturing procedures of the peripheral edge portion of the element substrate 60, corresponding to a cross section of the liquid crystal device 1 in FIG. 7 taken along line VII-VII.

Firstly, the scanning line 10, the common line 30 and the gate electrode 511 are formed in the display region A of the element substrate 60, while the scanning line 10 and the data line 20 are formed in the peripheral edge portion of the element substrate 60.

That is, a metal layer is formed over the glass substrate 68 by spattering. Then, the glass substrate 68 with the metal layer formed is processed by photolithography and etching.

Figure 8A:
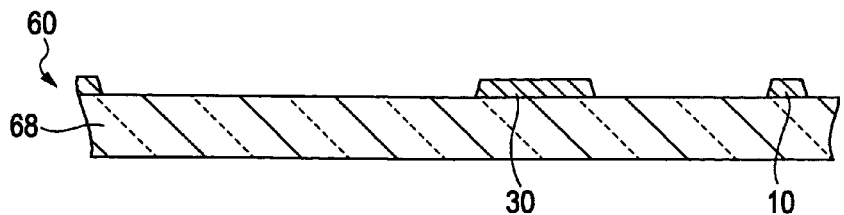
FIGS. 8A through 8E are illustrations showing manufacturing procedures for a display region of an element substrate of the liquid crystal display.

Accordingly, as shown in FIG. 8A, the gate electrode 511 which protrudes from the scanning line 10 to the reflective region 50B in the vicinity of the intersection with the data line 20 is formed on the glass substrate 68 in the display region A of the element substrate 60, in addition to the scanning line 10 and the common line 30.

Figure 9A:
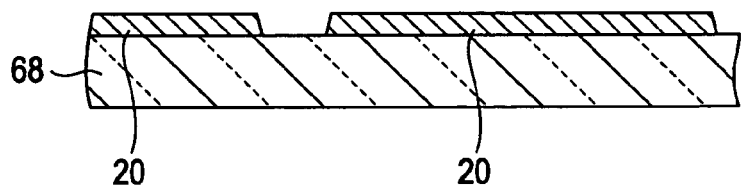
FIGS. 9A through 9E are illustrations showing manufacturing procedures for a peripheral edge portion of the element substrate of the liquid crystal display.

At the same time, as shown in FIG. 9A, the scanning line 10 and the data line 20 are formed on the glass substrate 68 in the peripheral edge portion of the element substrate 60.

Then, the gate insulation film 62 and the contact hole 621 are formed in the display region A of the element substrate 60, while the gate insulation film 62 and the contact holes 622 and 623 are formed in the peripheral edge portion of the element substrate 60.

That is, the gate insulation film 62 is formed over the pixel 50 including the reflective region 50B and the transmissive region 50A by CVD (chemical vapor deposition) method. Then, the glass substrate 68 formed with the gate insulation film 62 is processed by photolithography and etching.

Figure 8B:
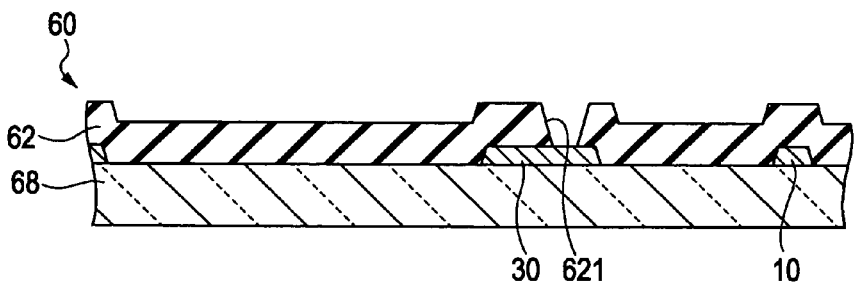

Accordingly, as shown in FIG. 8B, the gate insulation film 62 is formed over the pixel 50 including the reflective region 50B and the transmissive region 50A, on the scanning line 10 and the common line 30 in the display region A of the element substrate 60. In the gate insulation film 62, the contact hole 621 is formed so that the common-potential-side capacitance electrode 53B, which serves as the second capacitance electrode of the storage capacitor 53, is connected to the common line 30.

Figure 9B:
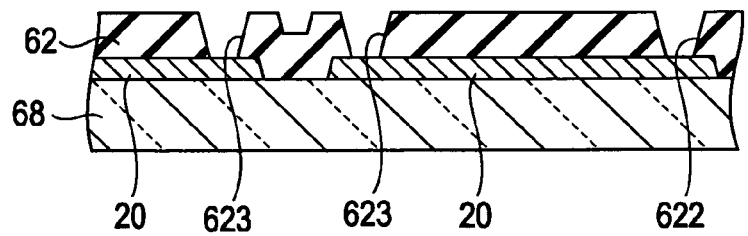

At the same time, as shown in FIG. 9B, the gate insulation film 62 is formed on the scanning line 10 and the data line 20 in the peripheral edge portion of the element substrate 60. Formed in the gate insulation film 62 are the contact hole 622 for allowing the data line 20 formed on the underlying insulation layer to be electrically connected to the data line 20 formed on the gate insulation film 62; and the contact hole 623, which is also formed in the passivation film 64 (formed by the below-describing manufacturing procedure), for allowing the scanning line 10 and the data line 20 formed on the underlying insulation film to be electrically connected to the driver IC 40.

Then the common-potential-side capacitance electrode 53B, the source electrode 512, the drain electrode 513, and the data line 20 are formed in the display region A of the element substrate 60, while the data line 20 is formed in the peripheral edge portion of the element substrate 60.

That is, a metal layer is formed over the pixel 50 including the reflective region 50B and the transmissive region 50A by spattering. Then the element substrate 60 formed with the metal layer is processed by photolithography and etching.

Figure 8C:
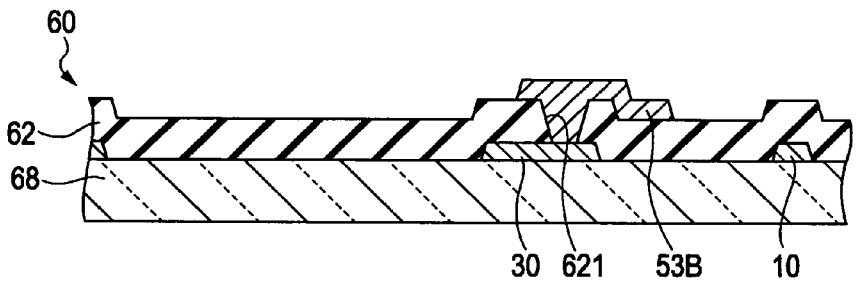

Accordingly, as shown in FIG. 8C, the common-potential-side capacitance electrode 53B of the storage capacitor 53 is formed in the display region A of the element substrate 60, on the gate insulation film 62 in the reflective region SOB at an area not occupied by the TFT 51. The common-potential-side capacitance electrode 53B is electrically connected to the common line 30 through the contact hole 621.

In addition, the semiconductor layer (not shown) made of amorphous silicon, and then the ohmic contact layer (not shown) made of n+ amorphous silicon are laminated on the gate insulation film 62 in the region 50C with the TFT 51 formed, so as to oppose the gate electrode 511. Then the source electrode 512 and the drain electrode 513 are laminated on the ohmic contact layer to form the amorphous silicon TFT. The source electrode 512 is made of the same conductive material (the same layer) as the data line 20.

Figure 9C:
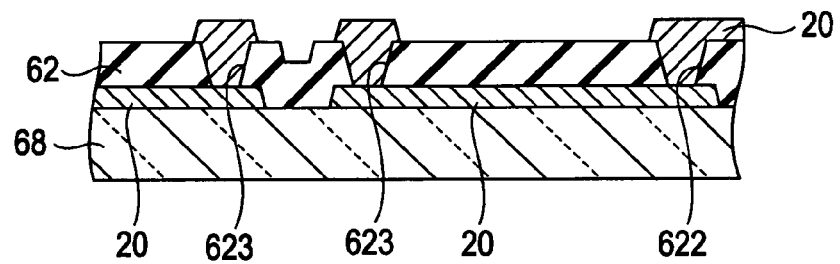

At the same time, as shown in FIG. 9C, the data line 20 is formed on the gate insulation film 62 in the peripheral edge portion of the element substrate 60. The data line 20 formed on the gate insulation film 62 is electrically connected to the data line 20 formed on the underlying insulation film through the contact hole 622. The same conductive material as that of the data line 20 formed on the gate insulation film 62 is also formed at the surface of the contact hole 623.

Then the passivation film 64, the transmissive-region-side pixel electrode 55A and the pixel-potential-side capacitance electrode 53A are formed in the display region A of the element substrate 60, while the passivation film 64, the contact hole 623 and the conductive electrode 67 are formed in the peripheral edge portion of the element substrate 60.

That is, the passivation film 64 is formed over the pixel 50 including the reflective region 50B and the transmissive region 50A by CVD method. Then only the peripheral edge portion of the element substrate 60 with the passivation film 64 formed is processed by photolithography and etching. Then the transparent conductive film like ITO (Indium Tin Oxide) or IZO (Indium Zinc Oxide) is formed on the passivation film 64 by spattering. Then the glass substrate 68 formed with the transparent conductive film is processed by photolithography and etching.

Figure 8D:
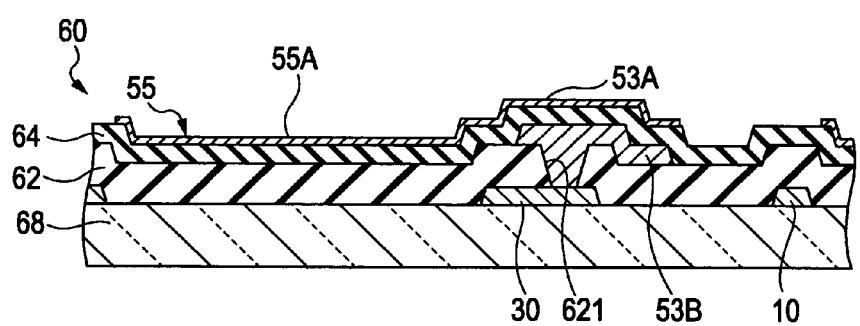

Accordingly, as shown in FIG. 8D, the passivation film 64 is formed on the common-potential-side capacitance electrode 53B, the source electrode 512, the drain electrode 513, the data line 20 and the transmissive region 50A, i.e., over the pixel 50 including the reflective region 50B and the transmissive region 50A.

Then the transparent conductive film is formed on the passivation film 64, to extend from the transmissive region 50A to an area opposing the common-potential-side capacitance electrode 53B in the reflective region 50B. The transparent conductive film serves as the transmissive-region-side pixel electrode 55A in the transmissive region 50A, while serving as the pixel-potential-side capacitance electrode 53A in the reflective region 50B.

Figure 9D:
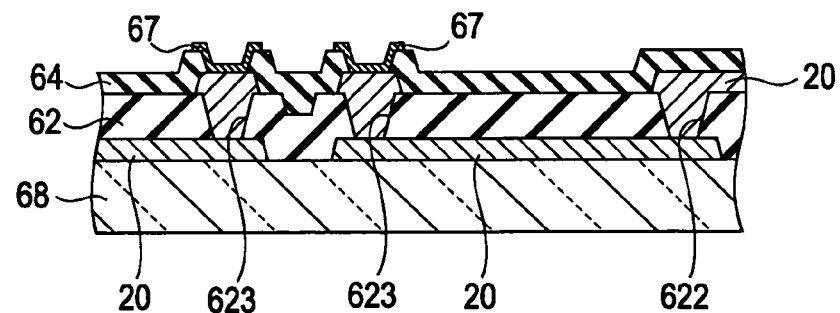

At the same time, as shown in FIG. 9D, the passivation film 64 is formed on the data line 20, which is formed on the gate insulation film 62, in the peripheral edge portion of the element substrate 60. The contact hole 623 for allowing the scanning line 10 and data line 20 formed on the underlying insulation film to be electrically connected to the driver IC 40 is formed in the passivation film 64 as well as in the gate insulation film 62.

The conductive electrode 67 formed by the transparent conductive film is formed on the same conductive material as that of the data line 20, which is formed on the gate insulation film 62 at the surface of the contact hole 623.

Then the liquid crystal thickness adjustment layer 65 and the reflective-region-side pixel electrode 55B are formed in the display region A of the element substrate 60.

That is, a resist is formed over the pixel 50 including the reflective region 50B and the transmissive region 50A by spin coating, pre-baked, and then exposed and developed. Then, a photo mask with a predetermined pattern is aligned with the resist, to form the liquid crystal thickness adjustment layer 65, which is made of acrylic resin and has fine recessed portions on the surface thereof. Then the element substrate 60 formed with the liquid crystal thickness adjustment layer 65 having the fine recessed portions, is treated with heat.

Note that the manufacturing of the liquid crystal thickness adjustment layer 65 and the reflective-region-side pixel electrode 55B are not proceeded for a non-display region.

Figure 8E:
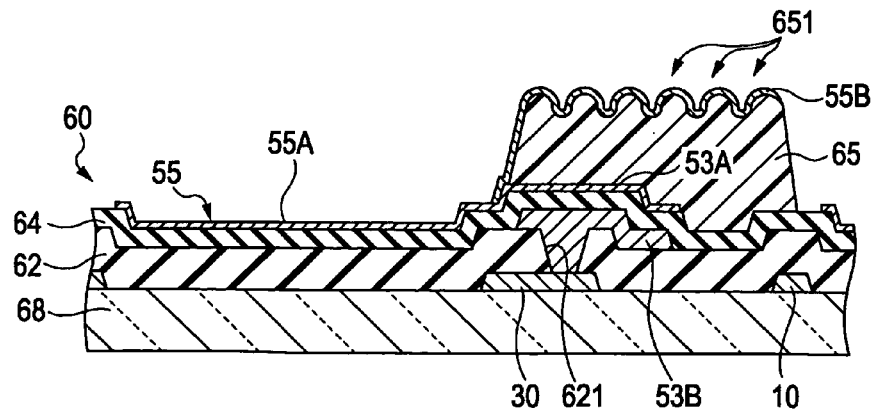

Accordingly, as shown in FIG. 8E, the liquid crystal thickness adjustment layer 65 is formed in the display region A of the element substrate 60, to extend from the reflective region 50B on the pixel-potential-side capacitance electrode 53A, to the reflective region 50B on the passivation film 64 at an area not occupied by the pixel-potential-side capacitance electrode 53A, the liquid crystal thickness adjustment layer 65 having the recessed portions 651, which are deformed to be round-angle fine recessed portions by the heat treatment. The reflective-region-side pixel electrode 55B is formed on the liquid crystal thickness adjustment layer 65. The reflective-region-side pixel electrode 55B is electrically connected to the transparent conductive film in the vicinity of the border of the transmissive region 50A and the reflective region 50B.

Figure 9E:
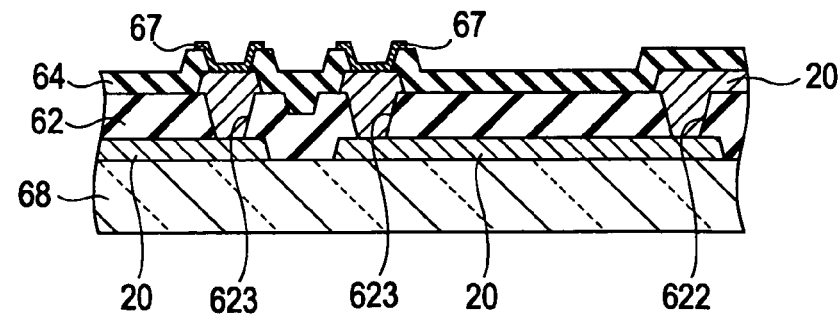

On the other hand, as shown in FIG. 9E, the liquid crystal thickness adjustment layer 65 and the reflective-region-side pixel electrode 55B are not formed in the non-display region.

According to the exemplary embodiment, the following advantages are provided.

(1) The passivation film 64 is provided on the TFT 51, and the pixel-potential-side capacitance electrode 53A and the common-potential-side capacitance electrode 53B of the storage capacitor 53 are oppositely arranged with the passivation film 64 interposed. In addition, the gate insulation film 62 is provided between the scanning line 10 and the data line 20. Accordingly, the increase in thickness of the gate insulation film 62 can ensure the interval between the scanning line 10 and the data line 20, thereby preventing the cross talk and malfunction from occurring. In addition, the decrease in thickness of the passivation film 64 can ensure a sufficient capacity for the storage capacitor 53.

(2) The pixel-potential-side capacitance electrode 53A is formed by extending the transmissive-region-side pixel electrode 55A in the transmissive region 50A to the space between the passivation film 64 and the liquid crystal thickness adjustment layer 65. Accordingly, the transmissive-region-side pixel electrode 55A and the pixel-potential-side capacitance electrode 53A can be manufactured easily according to the single procedure.

(3) The transmissive-region-side pixel electrode 55A in the transmissive region 50A is electrically connected to the reflective-region-side pixel electrode 55B in the reflective region 50B. Accordingly, even though the transmissive-region-side pixel electrode 55A in the transmissive region 50A is extended to the reflective region 50B to serve as the pixel-potential-side capacitance electrode 53A, the driving voltage can be applied to the liquid crystal in the reflective region 50B.

(4) The reflective-region-side pixel electrode 55B, which serves as the reflection film, is provided in the reflective region 50B. Accordingly, the reflective-region-side pixel electrode 55B can reflect the incident light to perform the reflective display.

(5) The common-potential-side capacitance electrode 53B is formed in an island-like shape, and is electrically connected to the common line 30 in the lower layer, so that the common line 30 is electrically connected to the common electrode 56. Accordingly, the driving voltage of the liquid crystal caused by the potential difference between the pixel electrode 55 and the common electrode 56 can be held by the pixel-potential-side capacitance electrode 53A, which has the same potential as that of the pixel electrode 55, and by the common-potential-side capacitance electrode 53B, which has the same potential as that of the common electrode 56.

Modification

Note that the invention is not limited to the above-described exemplary embodiment, and includes modifications and improvements as long as the advantage of the invention can be attained.

For instance, while the TFT 51 made of amorphous silicon is provided as the switching element in the exemplary embodiment, a TFT made of low-temperature polysilicon may be alternatively provided.

While the pixel-potential-side capacitance electrode 53A of the storage capacitor 53 is provided in a part of the reflective region 50B on the passivation film 64 in the exemplary embodiment, for instance, the pixel-potential-side capacitance electrode 53A may be provided in all region in the reflective region 50B on the passivation film 64 except an area occupied by the TFT 51. In such a case, by disposing the common-potential-side capacitance electrode 53B oppositely to the pixel-potential-side capacitance electrode 53A to have the surface area equal to or larger than that of the pixel-potential-side capacitance electrode 53A, a larger capacity can be ensured for the storage capacitor 53.

While the contact hole 621 is formed substantially at the center of each pixel 50 in the exemplary embodiment, for instance, the contact hole 621 may be formed in the edge of the pixel 50 or above the common line 30. In such a case, the influence of the contact hole 621 on the liquid crystal thickness adjustment layer 65 can be decreased.

While the TFT 51 is formed in the reflective region 50B in the exemplary embodiment, for instance, the pixel electrode and the reflection film may be formed not to interfere with the TFT.

While the liquid crystal thickness adjustment layer 65 is provided only on the element substrate 60 in the exemplary embodiment, the liquid crystal thickness adjustment layer 65 may be provided on the element substrate 60 as well as on the counter substrate 70.

Exemplary Application

Next, an electronic apparatus to which the liquid crystal device 1 according to the above-described exemplary embodiment is applied will be described below.

Figure 10:
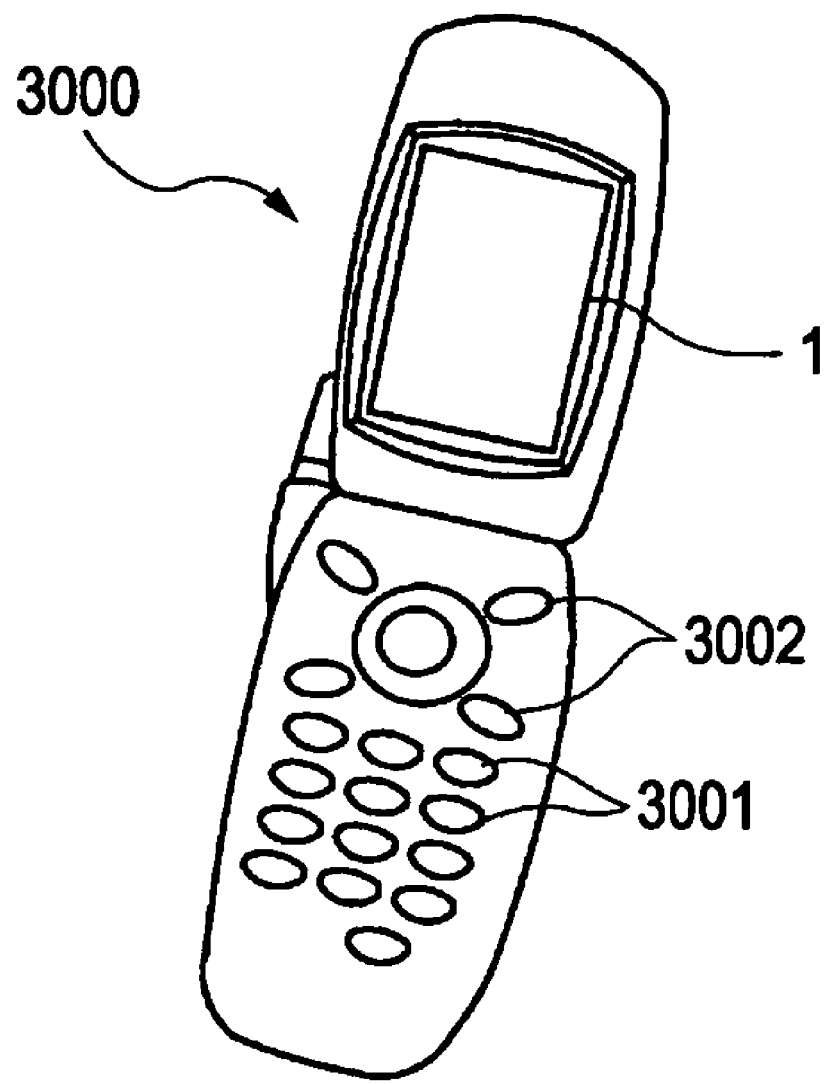
FIG. 10 is a perspective view showing the configuration of a mobile phone to which the liquid crystal device is applied.

FIG. 10 is a perspective view showing the configuration of a mobile phone to which the liquid crystal device 1 is applied. A mobile phone 3000 includes a plurality of operation buttons 3001, a scroll button 3002 and the liquid crystal device 1. Operating the scroll button 3002 scrolls a window displayed on the liquid crystal device 1.

Alternatively, in addition to the electronic apparatus shown in FIG. 10, the electronic apparatus to which the liquid crystal device 1 is applied may be a personal computer, a mobile information terminal, a digital still camera, a liquid crystal television, a viewfinder or monitor-direct-viewing videotape recorder, a vehicle navigation device, a pager, an electronic notebook, an electronic desk calculator, a word processor, a workstation, a videophone, a POS terminal, an apparatus equipped with a touch panel, or the like. The above-described liquid crystal device can be applied to a display of such an electronic apparatus.

What is claimed is:

1. A liquid crystal device, comprising:
a first substrate including a scanning line and a data line intersecting with the scanning line to define a pixel, said pixel comprising a switching element, a pixel electrode and a storage capacitor;
a second substrate opposing the first substrate; and
liquid crystal interposed between the first substrate and the second substrate;
wherein
a region where the pixel electrode is provided includes a reflective region and a transmissive region;
an insulation layer is provided in the reflective region and the transmissive region to cover the switching element;
a liquid crystal thickness adjustment layer is provided on the insulation layer in the reflective region;
the pixel electrode comprises a first pixel electrode portion provided on the insulation layer in the transmissive region, and a second pixel electrode portion provided on the liquid crystal thickness adjustment layer in the reflective region;

the storage capacitor includes a first capacitor electrode which is disposed on the insulation layer in the reflective region and is electrically connected to the pixel electrode, and a second capacitor electrode opposing the first capacitor electrode with the insulation layer disposed therebetween;

the first capacitor electrode is an extension of the first pixel electrode portion into the reflective region where said extension is located between the insulation layer and the liquid crystal thickness adjustment layer; and the first pixel electrode portion is electrically connected to the second pixel electrode portion.

2. The liquid crystal device according to claim 1, wherein the first pixel electrode portion and the first capacitor electrode defined by the extension of said first pixel electrode portion are transparent and electrically conductive.

3. The liquid crystal device according to claim 2, wherein the second pixel electrode portion provided in the reflective region is a reflection film.

4. The liquid crystal device according to claim 1, wherein the second capacitor electrode is electrically connected to a common line below the second capacitor electrode.

5. An electronic apparatus, comprising the liquid crystal device according to claim 1.

6. A method of manufacturing a liquid crystal device which includes:

a first substrate including a scanning line and a data line intersecting with the scanning line to define a pixel, said pixel comprising a switching element, a pixel electrode and a storage capacitor, a second substrate opposing the first substrate, liquid crystal interposed between the first substrate and the second substrate, the method comprising:

defining a reflective region and a transmissive region where the pixel electrode is to be formed;

forming a lower capacitor electrode of the storage capacitor in the reflective region;

forming an insulation layer in the reflective region and the transmissive region to cover the switching element and the lower capacitor electrode of the storage capacitor;

forming a first part of the pixel electrode on the insulation layer in both the transmissive region and the reflective region, wherein a portion of said first part of the pixel electrode in the reflective region is located opposing the lower capacitor electrode and defines an upper capacitor electrode of the storage capacitor;

forming a liquid crystal thickness adjustment layer on the upper capacitor electrode in the reflective region; and forming a second part of the pixel electrode on the liquid crystal thickness adjustment layer in the reflective region, wherein the first part of the pixel electrode is electrically connected to the second part of the pixel electrode.

7. The method according to claim 6, wherein the first part of the pixel electrode, including the upper capacitor electrode, is made of a transparent and electrically conductive material, and the second part of the pixel electrode is a reflection film.

8. The method according to claim 7, further comprising forming a gate insulation film, other than said insulation layer, between the scanning line and the data line;

wherein said lower capacitor electrode is provided between said gate insulation film and said insulation layer.

9. The method according to claim 6, further comprising forming a gate insulation film, other than said insulation layer, between the scanning line and the data line;

wherein said lower capacitor electrode is provided between said gate insulation film and said insulation layer.

10. The liquid crystal device according to claim 2, further comprising:

a gate insulation film other than said insulation layer and being provided between the scanning line and the data line;

wherein said second capacitor electrode is provided between said gate insulation film and said insulation layer.

11. The liquid crystal device according to claim 1, further comprising:

a gate insulation film other than said insulation layer and being provided between the scanning line and the data line;

wherein said second capacitor electrode is provided between said gate insulation film and said insulation layer.

* * * * *